UNITED STATES PATENT OFFICE.

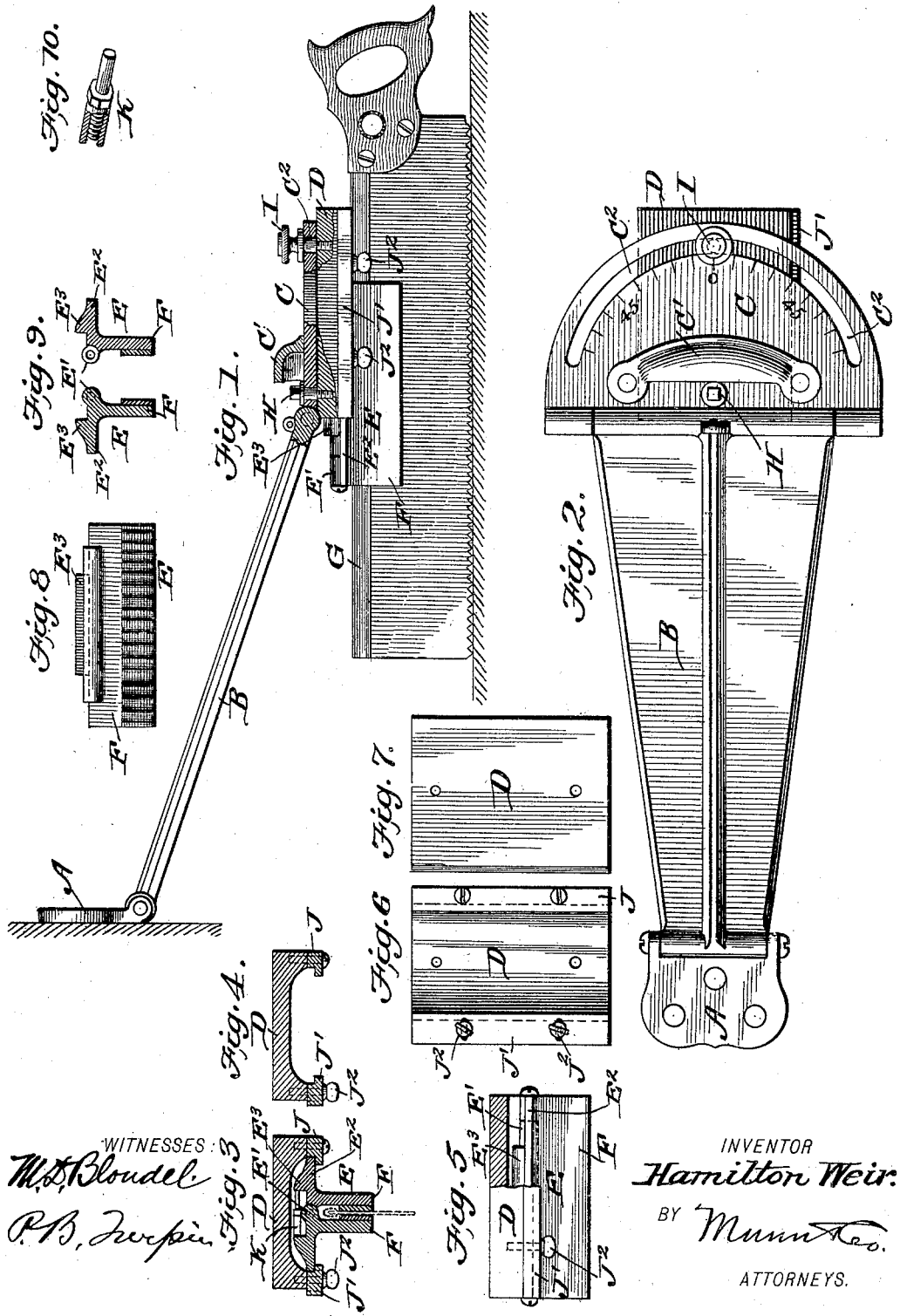

HAMILTON WEIR, OF LA PORTE, INDIANA.

MITER-SAW GUIDE.

SPECIFICATION forming part of Letters Patent No. 604,673, dated May 24, 1898.

Application filed February 7, 1898. Serial No. 669,427. (No model.)

*To all whom it may concern:*

Be it known that I, HAMILTON WEIR, a resident of La Porte, in the county of La Porte and State of Indiana, have invented certain new and useful Improvements in Miter-Saw Guides, of which the following is a full, clear, and exact specification.

My invention is an improved guide for use in cutting miters, bevels, or both combined, seeking to provide a simple construction for use of unlimited capacity instead of the ordinary miter-box, so limited in its action; and the invention consists in certain novel constructions and combinations of parts, as will be hereinafter described, and pointed out in the claims.

In the drawings, Figure 1 is a side view of my improved guide. Fig. 2 is a top plan view thereof. Fig. 3 is a transverse cross-sectional view through the main plate and the guide-sections. Fig. 4 is a similar view through the main plate. Fig. 5 is a side elevation, partly broken away, of the main plate and guide-section. Figs. 6 and 7 are respectively bottom and top plan views of the main plate. Fig. 8 is a detail side view of one of the guide-sections. Fig. 9 is a detail cross-section of the guide-sections, and Fig. 10 is a detail view of the spreading device.

By my invention I provide saw-guides between which the blade of the saw is clamped and means whereby such saw-guides are supported from above and move freely back and forth, so that the means for supporting the saw may be independent of the base on which the work to be cut is rested.

In the construction shown I provide a wall plate or bracket A, to which is hinged at one end the hanger B, to the opposite or outer end of which is hinged the front end of the cap-plate C, to the under side of which is secured the main plate D, which may be adjusted rotarily to any desired angle and supports on its under side the guide for the saw, which preferably consists of the two similar sections E, having the depending flanges or plates F, spaced apart to receive between them the blade of the saw, which latter may be the usual miter-saw, having a rib G at its upper edge, as shown in Fig. 1, or the ordinary carpenter's hand-saw.

By the described construction the hanger is so supported that it can be swung upward against the wall, where it may be secured out of the way in any desired manner, and the cap-plate, being hinged to the hanger and the latter to the wall-plate, permits the adaptation of the saw-guide for operation in connection with boards of different thicknesses and also permits the saw-guide to descend as the sawing proceeds.

The cap-plate C is provided with a handle C' to vary the pressure, and has near its rear edge a slot $C^2$, graduated and curved on an arc struck from the bolt H as a pivot, and this bolt H serves to pivotally connect the main plate D to the cap-plate C, while a screw I, passed through the slot $C^2$ and into the main plate D, operates to hold the main plate in any position to which it may be adjusted on the screw H as a pivot, as will be readily understood from Figs. 1 and 2. This enables me to readily adjust the main plate to the position for cutting any desired angle and also to secure it in such position by simply tightening the screw I.

In its under side the main plate is provided with a hollow or concave recess to receive the guide-sections and to permit the adjustment thereof as may be desired, the plate being provided at its opposite edges with the ribs or rails J J' for securing the guide-sections, the rib J' being secured so it can be easily removed, preferably by means of the thumb-screws $J^2$, and adjusted to take up wear.

The sections E when made adjustable are united by a hinge-joint at E' at the upper ends of the plates F, so they can be adjusted to clamp the saw firmly. The top plates $E^2$ of the guide-sections rest at their outer edges upon the rails J J' and are provided on their upper faces on opposite sides of the hinge-joint E' with inwardly-facing shoulders $E^3$, between which operates the spreading device K, which serves to secure the adjustment of the plates F toward each other and against the saw-blade, as described. The spreading device K may be of the special construction shown in detail in Fig. 10, or any other suitable means may be used for forcing the shoulders $E^3$ apart to secure the desired adjustment of and clamping by the guide-sections.

The inner faces of the plates F may be serrated for a short distance from their lower edges and may be lined with rubber or other suitable material to form a proper surface to bind on opposite sides of the saw-blade and prevent its slipping.

In the operation of my guide the guide-sections may be removed entirely from the main plate and readily adjusted by the spreading device and then reinserted in the main plate and secured by properly applying the rib J' to take up any side or loose motion.

As before stated, the saw-guide may be swung out of the way when not in use and may be conveniently moved, when desired, down to position for use, as shown in Fig. 1.

The "degree" marks on plate C, with "0" at the center of half-circle formed and which insures the saw-blade being at right angle to axis of hinge H, are necessary.

The preliminary step toward the use of the miter-saw guide is to place the thumb-screw I, which should show a mark for adjustment to degree-marks on plate C, at "0." Then with the saw-blade in position an ordinary carpenter's steel square is placed against the blade while resting on the top of the bench, and against the other side of square a "strip" should be nailed to the bench, affording thereby a "stop," against which stuff to be sawed can be firmly held. When once done, the saw can be set at any of the degree-marks, and the cutting will be accurate.

Having thus described my invention, what I claim, and desire to secure by Letters Patent, is—

1. A saw-guide comprising the clamp-sections hinged together and having below their hinged connection depending plates forming a clamp for the saw-blade, means operating above said hinge connection whereby the depending plates may be forcibly set toward each other and a guide in which the clamp-sections are slidable lengthwise substantially as set forth.

2. In a miter-saw guide the combination of the main plate having guides and the clamp-sections hinged together and held to said main plate by said guides and movable in the direction of their length in said guides substantially as set forth.

3. In a miter-saw guide the combination of the hanger, a cap-plate pivoted or hinged to the swinging end of the hanger, and a main plate provided with the guide devices and movable rotarily on the cap-plate substantially as set forth.

4. The combination of the cap-plate, the hanger supporting said cap-plate, the main plate having the guide devices and pivotally connected with the cap-plate whereby it may be adjusted thereon and means for securing the main plate in any desired adjustment substantially as set forth.

5. In a miter-saw guide the combination of a main plate having at its outer edges securing ribs or rails and the clamp-sections having depending plates spaced apart forming a clamp for the saw-blade, and top plates resting at their outer edges on the ribs or rails substantially as set forth.

6. In a miter-saw guide the combination of the clamp-sections hinged together, devices for adjusting said sections and a support in which the clamp-sections are movable in the direction of their length substantially as set forth.

7. The combination of the cap-plate, a support therefor the main plate adjustable on the cap-plate, means for securing the main plate in its different adjustments, the clamp-sections hinged together and supported by the main plate and means for adjusting the clamp-sections substantially as set forth.

8. The combination in a miter-saw guide of the guide-sections having depending plates spaced apart forming a clamp for the saw-blade and top plates provided with inwardly-facing shoulders, of a spreading device operating between said shoulders whereby to adjust the clamping plates or arms and a support for the clamp-sections substantially as set forth.

9. The miter-saw guide herein described comprising the cap-plate having a curved slot, the hanger to which said cap-plate is jointed, the main plate pivoted to the cap-plate and movable thereon to different adjustments, the screw for securing the main plate in its different adjustments, the clamp-sections hinged together, the spreading device by which to adjust the said clamp-sections and the ribs or rails by which the moving clamp-sections are held to the main plate substantially as set forth.

HAMILTON WEIR.

Witnesses:
  MOLLIE EVA PUNSKY,
  HENRIETTA E. WEIR.